(12) United States Patent
Clohset et al.

(10) Patent No.: US 10,255,105 B2
(45) Date of Patent: Apr. 9, 2019

(54) PARALLEL COMPUTING ARCHITECTURE FOR USE WITH A NON-GREEDY SCHEDULING ALGORITHM

(71) Applicant: Imagination Technologies Limited, Kings Langley (GB)

(72) Inventors: Steven J. Clohset, San Francisco, CA (US); Luke T. Peterson, San Francisco, CA (US); Joseph M. Richards, San Francisco, CA (US)

(73) Assignee: Imagination Technologies Limited, Kings Langley (GB)

( * ) Notice: Subject to any disclaimer, the term of this patent is extended or adjusted under 35 U.S.C. 154(b) by 46 days.

(21) Appl. No.: 15/484,607

(22) Filed: Apr. 11, 2017

(65) Prior Publication Data
US 2018/0293099 A1 Oct. 11, 2018

(51) Int. Cl.
*G06F 9/48* (2006.01)
*G06F 9/50* (2006.01)
*G06F 9/54* (2006.01)

(52) U.S. Cl.
CPC .......... *G06F 9/4881* (2013.01); *G06F 9/5033* (2013.01); *G06F 9/5038* (2013.01); *G06F 9/546* (2013.01)

(58) Field of Classification Search
CPC ..................................................... G06F 9/4881
See application file for complete search history.

(56) References Cited

U.S. PATENT DOCUMENTS

2012/0320070 A1 12/2012 Arvo

*Primary Examiner* — Charlie Sun
(74) *Attorney, Agent, or Firm* — Vorys, Seymour and Pease LLP; Vincent M DeLuca

(57) ABSTRACT

Methods and architectures for coordinating the operation of a plurality of processing units in a parallel computing architecture wherein each processing unit is configured to process work elements of dynamically generated work groups using a resource (e.g. memory) associated with the work group. The method includes requesting a resource (associated with one of the work groups) from a main storage for use by a first processing unit which causes the resource to be stored in a temporary storage (e.g. cache); transmitting a notification message to a scheduling unit associated with a second processing unit indicating that the resource has been requested; in response to receiving the notification message at the scheduling unit associated with the second processing unit, determining whether a pool of pending work associated with the second processing unit comprises a pending work group associated with the resource; and if so, prioritizing processing of that work group by the second processing unit so as to obtain the resource from the temporary storage.

20 Claims, 7 Drawing Sheets

PARALLEL COMPUTING ARCHITECTURE FOR USE WITH A NON-GREEDY SCHEDULING ALGORITHM

BACKGROUND

As is known to those of skill in the art, parallel computing is a type of computing architecture in which several processing units execute or process work in parallel to complete a task. Specifically the task is divided into smaller components, which can be executed by the processing units in parallel. In many cases, using a parallel computing architecture can significantly reduce the amount of time to complete a task compared to using a serial computing architecture (e.g. a single processing unit). However, parallel computing architectures can create inefficiencies in some cases when different processing units are completing similar tasks independently.

The embodiments described below are provided by way of example only and are not limiting of implementations which solve any or all of the disadvantages of known parallel computing architectures.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described herein are methods and architectures for coordinating the operation of a plurality of processing units in a parallel computing architecture wherein each processing unit is configured to process work elements of a dynamically generated work group using a resource associated with the work group. The method includes requesting for a first processing unit, a resource (associated with one of the work groups) from a main storage (e.g. main memory) which causes the resource to be stored in a temporary storage (e.g. a cache); transmitting a notification message indicating that the resource has been requested; in response to receiving the notification message at scheduling logic associated with a second processing unit, determining whether a pool of pending work associated with the second processing unit comprises a pending work group associated with the resource; and if so, prioritizing processing of that work group by the second processing unit so as to obtain the resource from the temporary storage.

A first aspect provides a parallel computing architecture comprising, for each of a plurality of processing units: a pool of pending work configured to store one or more work groups, each work group being associated with a resource and comprising one or more work elements to be processed by the processing unit using that resource; scheduling logic configured to: select a work group of the one or more work groups for processing; request a particular resource associated with the selected work group from a main storage, for storage in a temporary storage; transmit a notification message to one or more other processing units of the plurality of processing units, the notification message comprising an indication of the requested particular resource; and in response to receiving a notification message from another processing unit of the plurality of processing units which comprises an indication of a specific resource that has been requested, determine whether the pool of pending work comprises a work group associated with the specific resource; and in response to determining that the pool of pending work comprises a work group associated with the specific resource, prioritize processing of the work group associated with the specific resource so as to obtain the specific resource from the temporary storage.

A second aspect provides a method of coordinating the operation of a plurality of processing units in a parallel computing architecture, the method comprising: requesting a resource from a main storage, for storage in a temporary storage, the resource being associated with a work group of one or more work groups in a first pool of pending work associated with a first processing unit of the plurality of processing units, each work group of the one or more work groups comprising one or more work elements to be processed by the first processing unit using the associated resource; transmitting a notification message to scheduling logic associated with a second processing unit of the plurality of processing units, the notification message comprising an indication of the requested resource; in response to receiving the notification message at the scheduling logic associated with the second processing unit, determining whether a second pool of pending work associated with the second processing unit comprises a work group associated with the resource; and in response to determining that the second pool of pending work comprises a work group associated with the resource, prioritizing processing of the work group associated with the resource by the second processing unit so as to obtain the resource from the temporary storage.

Further aspects provide: a parallel computing architecture configured to perform a method as described herein; computer readable code configured to cause a method as described herein to be performed when the code is run; a method of manufacturing, using an integrated circuit manufacturing system, a parallel computing architecture as described herein; an integrated circuit definition dataset that, when processed in an integrated circuit manufacturing system, configures the integrated circuit manufacturing system to manufacture a parallel computing architecture as described herein; a computer readable storage medium having stored thereon a computer readable description of an integrated circuit that, when processed in an integrated circuit manufacturing system, causes the integrated circuit manufacturing system to manufacture a parallel computing architecture as described herein; and an integrated circuit manufacturing system configured to manufacture a parallel computing architecture as described herein.

Another aspect provides an integrated circuit manufacturing system comprising: a non-transitory computer readable storage medium having stored thereon a computer readable description of an integrated circuit that describes the parallel computing architecture as described herein; a layout processing system configured to process the integrated circuit description so as to generate a circuit layout description of an integrated circuit embodying parallel computing architecture; and an integrated circuit generation system configured to manufacture the parallel computing architecture according to the circuit layout description.

The parallel computing architecture may be embodied in hardware on an integrated circuit. There may be provided a method of manufacturing, at an integrated circuit manufacturing system, a parallel computing architecture. There may be provided an integrated circuit definition dataset that, when processed in an integrated circuit manufacturing system, configures the system to manufacture a parallel computing architecture. There may be provided a non-transitory computer readable storage medium having stored thereon a computer readable description of an integrated circuit that, when processed, causes a layout processing system to generate a circuit layout description used in an integrated circuit manufacturing system to manufacture a parallel computing architecture.

There may be provided an integrated circuit manufacturing system comprising: a non-transitory computer readable storage medium having stored thereon a computer readable integrated circuit description that describes the parallel computing architecture; a layout processing system configured to process the integrated circuit description so as to generate a circuit layout description of an integrated circuit embodying the parallel computing architecture; and an integrated circuit generation system configured to manufacture the parallel computing architecture according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
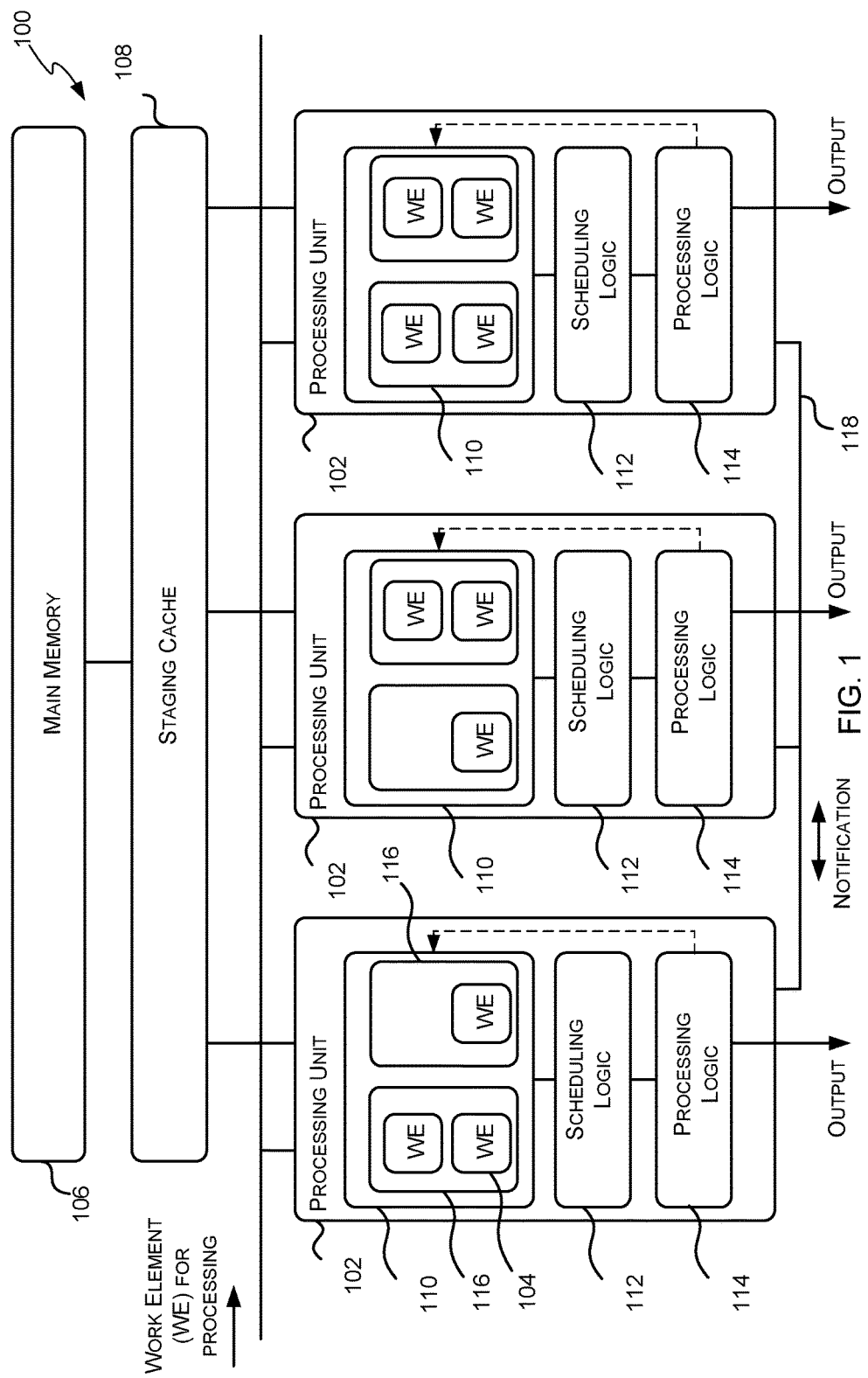
FIG. 1 is a block diagram of an example parallel computing architecture.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

In parallel computing architectures, the task to be completed is divided into a plurality of smaller units of work (which may be referred to herein as work elements) which are distributed amongst the processing units. In some cases the work elements that have been distributed to a particular processing unit may be stored in a pool of pending work associated with the particular processing unit where they wait to be processed. When the particular processing unit is ready to process the next work element(s), one or more work elements are selected from the pool according to a scheduling algorithm. The pool of pending work may be implemented with any suitable structure (e.g. a store/memory) for storing work elements that are waiting to be processed by the particular processing unit.

For example, a greedy algorithm may be used to select the next work element(s) to process. As is known to those of skill in the art, a greedy algorithm selects the best solution (according to some criteria) at the current point in time, without regard for the overall solution. In other words, a greedy algorithm picks the best immediate output, but it does not consider the big picture. In accordance with a greedy algorithm any available work element(s) in the pool of pending work may be selected for processing.

While there are many applications where a greedy algorithm will be able to identify (or approximate) the globally optimum solution, there are many applications where a greedy algorithm will not produce the globally optimum solution. For example, in some cases, instead of simply selecting the best work elements on an individual basis, a task may be more efficiently completed by establishing coherence, or similarity, between work elements and processing similar work elements together. For example, where each work element is associated with a particular resource (e.g. block of memory) which a processing unit obtains to process the work element, instead of simply processing work elements as they arrive at a particular processing unit (e.g. according to a greedy algorithm), it may be more efficient to group work elements (e.g. to form work groups) so that the processing unit only obtains the resource (e.g. a block of memory) once and yet can process multiple work elements using that resource. In these cases, a non-greedy algorithm is used to select the next work element(s) to process. For example, a work group may be selected for processing based on the number of work elements in the group. For example, in some cases a work group may be prioritized for processing when it comprises enough work elements to fill a single instruction multiple data (SIMD) vector.

However, where it is possible for multiple processing units to receive and process work elements that are associated with the same resource (e.g. block of memory) this may result in different processing units obtaining the same resource at different times. For example, if there are two processing units (e.g. processing unit A and processing unit B) which both receive work elements related to the same resource (e.g. memory block C) that are grouped into a work group (e.g. work group D and E respectively), and a non-greedy scheduling algorithm is used to prioritize a work group for processing when the work group has at least five work elements. If processing unit A has five work elements in work group C and processing unit B has three work elements in work group D this may result in processing unit A obtaining the data from memory block C and processing the five work elements in work group D, then, subsequently, after processing unit B receives two more elements associated with memory block C, processing unit B obtaining the data from memory block C and processing the five work elements in work group E. As a result, both processing unit A and processing unit B separately obtain the data associated with memory block C. In some cases, it may be more efficient for processing unit B to process the work elements in work group E at the same time that processing unit A is processing the work elements in work group D instead of waiting for additional work elements so that processing unit B can take advantage of the fact that the data associated with memory block C has already been obtained by processing unit A.

Accordingly, described herein are parallel computing architectures and methods for use with a non-greedy scheduling algorithm in which the processing units notify the other processing units when they have obtained a particular resource to process one or more work elements so that if the other processing units have work elements associated with the same resource they can take advantage of the fact that the resource will be available. The architectures, methods and techniques described herein may significantly increase the throughput of the parallel computing architecture by for example, significantly reducing the time for a processing unit to obtain a particular resource and/or reducing the overhead in obtaining the resource. For example, where the resource is data in a block of memory the amount of data, and thus the bandwidth, between the memory and the processing units may be significantly reduced. The reduced load on the memory access subsystem may allow an overall system design with a less costly memory interface and/or the reduction in traffic to and from the memory may result in more bandwidth available for other workloads.

The methods, architectures and techniques described herein may be used in parallel computing architectures that are configured for a variety of applications wherein each work elements is associated with a resource and different processing units of the parallel computing architecture can be configured to process work elements associated with the same resource. The methods, architectures and techniques described herein have shown to be particularly useful in parallel computing architectures configured to implement parallel tree traversal problems. For example, the methods, architectures, and techniques described herein may be used in a parallel computing architecture that configured to implement aspects of a ray tracing algorithm. As is known to those of skill in the art, ray tracing is a technique of generating a three dimensional (3D) image that involves sending out a virtual ray for each pixel of the image, and performing intersecting testing on the ray as it traverses through the scene to determine which primitive(s) it intersects first. When an intersection between a ray and a primitive is found a shader program can be executed to determine the color value of the pixel.

An acceleration structure, which also may be referred to as a hierarchy, can be used to represent the primitives within a scene. Each node of the hierarchy may represent a portion of space within the 3D scene. At the top of the hierarchy the nodes represent large volumes, and the nodes further down the hierarchy represent smaller and smaller volumes, wherein a node at one level is linked to one or more nodes at the next lower level of the hierarchy if the one or more lower level nodes are wholly encompassed by the higher level node. The leaf nodes of the hierarchy typically represent the primitives within a scene. A ray is tested against the nodes of the hierarchy starting from the top. If a ray intersects a high level node then the ray is scheduled to be tested against the descendants of that high level node in the hierarchy. This process repeats until an intersection between the ray and a primitive is identified.

Since there is at least one ray for each pixel of an image there are a plurality of rays that are tested against the hierarchy for each 3D image. Each ray is associated with a node of the hierarchy which the ray will be tested against. Initially each ray is associated with the root node and if there is a hit on the root node (i.e. if it is determined that the ray intersects the 3D volume associated with the root node) then the ray is rescheduled for testing in association with the appropriate child node(s). Accordingly a processing unit configured to perform ray intersection testing receives a stream of rays to process as input. The processing unit cannot typically process all the received rays at the same time, so the processing unit selects one or more of the rays to process, obtains the data for the associated node(s) and processes the rays based on the obtained data. If there is a hit on the node (i.e. if it is determined that the ray intersects the 3D volume associated with the node) then the ray is associated with one or more child nodes and fed back to the input of the processing unit for further testing.

In some cases, the ray intersection testing throughput can be improved by using a non-greedy algorithm to select the rays to process. Specifically, since it does not matter what order the rays are tested, in some cases throughput may be improved by grouping the rays based on the node that they are associated with so that the rays associated with the same node are processed together. As described above, processing a ray includes obtaining the data related to the associated node. Accordingly, processing rays associated with the same node at the same time minimizes the number of times the processing unit has to fetch or obtain the data associated with that particular node.

In some cases, the throughput can be further improved by using a parallel computing architecture which comprises a plurality of processing units that are configured to process rays in parallel. The methods and architectures described herein in which the processing elements can be configured to notify each other when they obtain a particular resource for processing a work element may be used in parallel computing architectures that are configured to perform ray intersection testing.

Where the methods and techniques described herein are used in parallel computing architectures that are configured to perform ray intersection testing, not only may performance be improved by reducing the number of fetches of node data performed by the parallel processing units, further performance improvement may be achieved because by causing the processing units to process similar work elements (e.g. rays associated with a particular node) at the same time the processing units are likely to subsequently process similar nodes. This is because if there is a hit on the particular node for one or more rays then new work elements related to those rays will be generated that are associated with the child node(s) for that particular node. Thus if the processing elements are testing rays against a particular node at the same time they are likely to generate new work elements that are related to the same child nodes. Therefore if one processing unit obtains data for one node which many processing units use, those processing units are likely to need the same data for subsequent processing of work elements thus only one of the processing units also needs to obtain the subsequent data. This allows the processing units to remain aligned thus increasing the likelihood that subsequent work elements will share nodes and further reducing the number of fetches of main memory that have to be performed. In some cases when the methods and techniques described herein used in parallel computing architectures that are configured to perform ray intersection testing may also reduce the power consumption of such architectures.

The methods, architectures and techniques described herein may also be used in parallel computing architectures that are configured for different applications. For example, the methods, architectures and techniques described herein may also be used in a parallel computing architectures where code modules can describe producer-consumer relationships. For example, the methods and techniques described herein may be used in parallel computing architecture configured to implement ray intersection testing in producer-consumer manner. For example, instead of the work elements being a ray associated with a particular node, the work elements may be a ray associated with a list of nodes. When a work element is executed the processing unit fetches the data associated with the list of nodes from memory, tests the rays against each node and produces one output datum for each hit associating the ray with the corresponding children nodes. It would be advantageous in such an architecture for the processing units to co-ordinate their behaviour.

Reference is now made to FIG. 1 which illustrates an example parallel computing architecture 100 for use with a non-greedy scheduling algorithm where the processing units of the parallel computing architecture 100 are configured to notify each other when they have requested a resource for processing a work group. In response to receiving a notification the processing units determine if they have a pending work group associated with the resource and if so, prioritize that work group to take advantage of the resource being available.

The example parallel computing architecture 100 of FIG. 1 comprises a plurality of processing units 102 configured to process work elements 104; memory 106 for storing data associated with the work elements 104; and a staging cache 108 for temporarily storing data from the memory 106 for use by the processing units 102. The memory 106 may be referred to herein as "main storage", and may for example be implemented as DRAM. The cache 108 may be referred to herein as "temporary storage", and may refer to any type of temporary local storage. In particular, the term "cache" does not necessarily require conventional cache management structures or limitations, although in some examples, such structures may be used with the cache 108.

Each processing unit 102 is configured to receive work elements 104 representing sub-portions of a task and process the received work elements 104. At least an initial set of work elements is received from an external component (not shown), such as, but not limited to, a central processing unit (CPU) or a graphics processing unit (GPU). In some cases, an initial set of work elements 104 may be provided as an input to the processing unit 102 by an external component and subsequent work elements 104 may be provided as an input to the processing unit 102 by the processing logic 114 itself as shown by the dotted line in FIG. 1. Specifically, in some cases the initial set of work elements can recursively instantiate a further set of work elements and so on until one or more conditions are met. For example, if the parallel computing architecture is configured to implement ray intersection testing, the processing units 102 may receive an initial set of work elements 104 (rays associated with the root node) from one or more graphics processing units (GPUs) and as the processing logic 114 processes the initial set of work elements (e.g. determines if the initial set of rays intersect the root node) the processing logic 114 generates children work elements 104 (e.g. rays associated with one or more children nodes) which are fed back to the input. For example, a processing unit 102 may initially receive rays A, B, C for testing against the root node of the hierarchy, if the processing logic 114 determine that rays A and C intersect with the root node and the root node has two child nodes D and E, then the processing logic 114 will send rays A and C back to the input for further testing against child nodes D and E.

A work element 104 is a portion of a task that is to be completed by the parallel computing architecture. Specifically a task is divided into a plurality of work elements that can be completed in parallel. What constitutes a work element 104 will depend on the application in which the parallel computing architecture is used. For example, if the parallel computing architecture 100 is configured to implement ray intersection testing then the task is identification of the primitives that each ray intersects and each work element 104 represents a ray to be tested. However, it will be evident to a person of skill in the art that this is an example only and for other applications a work element may be another portion of the task to be completed.

Each work element 104 is associated with a resource which the processing units 102 obtain in order to process the work element 104. In the example of FIG. 1 the resource is a block of memory 106 (i.e. a location of memory 106). Accordingly, to process a work element 104 a processing unit 102 fetches the data contained in the block of memory 106 associated with the work element 104. However, this is an example only and in other examples the work elements 104 may be associated with other shared resources such as, but not limited to, other storage units such as a disk drive; a network-connected data resource such as a database; or the result of a complex mathematical operation The resource that a work element 104 is associated with may be identified in any manner that allows the processing unit 102 to determine and retrieve the resource that the work element 104 is associated with. For example, if the parallel computing architecture is configured to implement ray intersection testing the resource may be a block of memory that contains data for a particular node of the hierarchy and the resource may be identified by a node identifier (i.e. node ID). The processing unit 102 may then use the node ID to identify the corresponding block of memory using, for example, a lookup table or the like.

In the example shown in FIG. 1, the parallel computing architecture 100 comprises three processing units 102, however it will be evident to the person of skill of the art that this is an example only and in other examples there may be only two processing units 102, or there may be more than two processing units 102. Each processing unit 102 comprises a pool of pending work 110 for storing the received work elements 104, scheduling logic 112 for selecting work elements 104 from the pool 110 for processing, and processing logic 114 for processing the selected work elements 104. The pool of pending work 110 may be considered to be a set of pending work groups.

The pool of pending work 110 is configured to receive work elements 104, and store the received work elements 104 in association with one of one or more work groups 116. As described above, each work element 104 is associated with a resource which the processing unit 102 obtains to process the work element 104. In some cases, the work elements 104 are grouped into, or associated with, a particular work group 116 based on the resource associated with the work elements 104. For example, the work elements 104 associated with resource A may be grouped together to form a first work group, and the work elements 104 associated with resource B may be grouped together to form another work group. Specifically, where the parallel computing architecture is configured to implement ray intersection testing the rays associated with a particular node (e.g. node A) of the hierarchy may be grouped together to form one work group, and the rays associated with another node (e.g. node B) of the hierarchy may be grouped together to form another work group. Accordingly, in these cases each work group 116 is a collection of work elements associated with the same resource.

In some cases, when a new work element 104 is received at the pool of pending work 110 the resource associated with the work element is identified and used to identify a work group 116 associated with that resource. If a work group 116 exists for that resource then the received work element 104 is then stored in association with that work group 116. If, however, a work group 116 does not exist for that resource then a new work group 116 is created and then the received work element 104 is then stored in association with that work group 116.

In some cases the pool of pending work 110 may be configured as a cache (e.g. an n-way set associative cache) wherein each entry of the cache is used to store the work elements associated with a particular work group 116. When a new work element 104 is received an index into the cache is generated from the information identifying the resource the work element 104 is associated with (e.g. all or part of the node ID). For example, a hash may be performed and on the node ID to generate an index which is used to identify a particular entry of the cache. The received work element 104 (or a reference to the work element 104 (e.g. ray ID) may then be added to the identified entry of the cache to indicate that the work element 104 forms part of that work group 116.

In some cases the work groups 116 may be implemented as a queue which preserves an ordering of the associated work elements 104. For example, each work group 116 may be implemented as a FIFO (first in first out) queue wherein received work elements 104 are added to the back of the associated queue.

In the example shown in FIG. 1, each pool of pending work 110 is configured to store two work groups 116, however, it will be evident to a person of skill in the art that this is an example only and the pools of pending work 110 may be configured to store more than two work groups 116 or fewer than two work groups 116.

The scheduling logic 112 is configured to select one or more work groups from the pool of pending work 110 for processing by the processing logic 114 according to a non-greedy scheduling algorithm (which also may be referred to as a demand-driven scheduling algorithm). The number of work groups 116 that are selected for processing at any one time may depend on the configuration of the processing logic 114 and/or the scheduling logic 112. For example, in some cases the processing logic 114 may be configured to process multiple work groups 116 concurrently so the scheduling logic 112 may be configured to select multiple work groups 116 to satisfy the requirements of the processing logic 114. In other cases the processing logic 114 may be configured to process only one work group 116 at a time, but the scheduling logic may be configured to select multiple work groups 116 at a time for processing so that a selection of work groups for processing is only periodically performed. In yet other cases the processing logic 114 may be configured to process one work group 116 at a time and the scheduling logic 112 may be configured to select only one work group 116 at a time.

The scheduling logic 112 may be configured to select the one or more work groups 116 for processing according to one or more scheduling rules. For example, in some cases the scheduling logic 112 may be configured to prioritize the work groups 116 according to the scheduling rules and select one or more work groups 116 for processing based on the prioritization.

For example, in some cases work groups 116 with a predetermined number of work elements 104 may be prioritized over other work groups 116. In particular, where the processing logic 114 implements single instruction, multiple data (SIMD) processing logic the scheduling logic 112 may be configured to prioritize work groups 116 that have enough work elements to fill up the SIMD lanes. As is known to those of skill in the art, SIMD processing logic comprises multiple processing elements that perform the same operation on multiple data points simultaneously. The number of data points that can be processed in parallel is referred to as the number of SIMD lanes. For example, where the parallel computing architecture is configured to implement ray intersection testing the processing logic 114 may implement SIMD processing logic configured to receive an input SIMD vector of a predetermined size (e.g. X) representing X rays; test each of those rays against the same node data; and produce an output vector of size X representing the results of the testing for each ray. In this example, the scheduling logic 112 may be configured to prioritize work groups 116 that have X work elements (i.e. enough work elements to fill up an SIMD vector). Prioritizing work groups in this manner may be described as optimizing the compute saturation.

It will be evident to a person of skill in the art that this is an example only and that other criteria may be used to prioritize the work groups. For example, the scheduling logic 112 may also, or alternatively, be configured to prioritize the work groups 116 in order to (i) optimize forward progress; (ii) control state growth; (iii) minimize latency and/or (iv) to respect externally provided prioritization. Prioritizing work groups 116 to optimize forward progress may comprise for example, prioritizing work groups 116 that are closer to producing a terminal result (e.g. the work group 116 is associated with a node of the hierarchy that is, or is closer to, a leaf node) in order to control the amount of working state available. Prioritizing work groups 116 to control state growth may comprise prioritizing work groups 116 that lead to a decrease in total system state (e.g. a decrease in work elements—i.e. work groups that do not produce new work elements) over work groups 116 that lead to an increase in total system state (e.g. an increase in work elements 104—i.e. work groups that do produce new work elements 104) in order to keep the total system state (e.g. number of pending work elements 104) below a predetermined or acceptable threshold. Prioritizing work groups 116 to respect externally provided prioritizations may comprise, for example, where the work elements 104 are rays that are associated with different frames of an image the scheduling logic 112 may be externally configured to prioritize certain frames over other. For example, the scheduling logic 112 may be configured to prioritize work groups 116 with work elements (e.g. rays) associated with frame 0 over work groups with work elements (e.g. rays) associated with frame 1.

In some cases, once the scheduling logic 112 has selected one or more work groups 116 for processing (e.g. based on the work group 116 prioritization) the scheduling logic 112 pre-obtains (or pre-fetches) the resource associated with the work group 116 (i.e. the resource associated with the work elements 104 forming the work group 116). In particular, in the example of FIG. 1 the scheduling logic 112 obtains the data from the block of memory associated with the selected work group(s) 116. For example, if a work group 116 associated with memory block A (i.e. a work group 116 comprising work elements 104 associated with memory block A) is selected for processing the scheduling logic 112 performs a read of memory block A. In particular, where the parallel computing architecture 100 is used to implement ray intersection testing the scheduling logic 112 may be configured to obtain the data in memory corresponding to the node for which the work elements (rays) are to be tested against. As described above, in some cases the resource that a work element 104 is associated with is identified by an identifier such as a node ID which may be used to determine the memory address or memory block associated with that node. In other cases the resource may be identified by a memory address directly.

In the example of FIG. 1, the parallel computing architecture 100 comprises temporary storage, such as a staging cache 108, that is configured to hold a subset of the data of the main resource (e.g. main memory 106). As is known to those of skill in the art, a cache is memory (typically fast memory) that is configured to store a subset of the data stored in a main memory (e.g. memory 106) to reduce the time for a device (e.g. processing unit 102) to access the data stored in the main memory. When the device (e.g. processing unit 102) wants to access a specific memory address of the main memory (e.g. memory 106) the device first looks in the cache 108. If the cache 108 contains data associated with the specific memory address then there is a cache hit and the data is quickly and directly supplied to the device (e.g. processing unit 102) from the cache 108. If, however, the cache 108 does not contain data associated with the specific memory address then there is a cache miss and a read of the main memory (e.g. memory 106) is performed. The data read from the main memory (e.g. memory 106) is then stored in the cache 108 so that the data is available to a subsequent access of the specific memory address. The staging cache 108 may be part of a main processor, such as, but not limited to, a central processing unit (CPU) or a graphics processing unit (GPU), or may be separate from the main processor.

Accordingly, in this example, when the scheduling logic 112 wants to obtain the data corresponding to a particular memory block the scheduling logic 112 sends a read request (which identifies a particular memory address) to the staging cache 108. If the staging cache 108 includes data corresponding to the particular memory address then there is a cache hit and the data is provided directly to the requesting scheduling logic 112. If, however, the staging cache 108 does not comprise data corresponding to the particular memory address then there is a cache miss and a read of the main memory 106 is performed and the read data is provided to the requesting scheduling logic 112 and is also stored in the staging cache 108. Although the staging cache 108 is shown in FIG. 1 as being directly connected to the memory 106, in other examples the staging cache 108 may access the memory 106 through a memory interface (not shown). It will be evident to a person of skill in the art that this is an example and in other cases the staging cache 108 may form part of a cache hierarchy and obtaining the data corresponding to a particular memory block may be obtained in a typical manner using a cache hierarchy.

Once the scheduling logic 112 has selected the work group 116 for processing and obtained the associated resource, the scheduling logic 112 provides the work elements 104 forming the work group 116 and the associated resource to the processing logic 114 for processing.

The processing logic 114 is configured to process the one or more work elements received from the scheduling logic 112 in accordance with the resource received from the scheduling logic 112. The processing logic 114 may comprise hardware or software logic configured to process the received work elements. For example, the processing logic 114 may comprise one or more execution units such as an arithmetic logic unit (ALU), a floating-point unit (FPU), or any combination thereof. Where the parallel computing architecture is configured to implement ray intersection testing the processing logic 114 may comprise a plurality of ALUs configured to determine whether the received rays intersect a particular node based on the node data. Once the processing is complete the processing logic 114 produces an output of the processing. As described above, in some cases processing some work elements may produce an output (e.g. an indication of the primitive that a ray intersects) and processing other work elements may produce further work elements for processing (e.g. rays to be processed against child nodes).

In the examples described herein it is possible for different processing units 102 to receive work elements 104 that are associated with the same resource (e.g. same block of memory 106/same memory 106 address). For example, it is possible for a first processing unit 102 to receive a work element 104 that is associated with memory block A and a second processing unit 102 to receive a different work element 104 that is also associated with memory block A. As described above, without any coordination between the processing units 102 this may result in situations where different processing units 102 (e.g. different scheduling logic 112) separately obtain the same resource at different times.

To improve performance (e.g. throughput), in the examples described herein the processing units 102 are configured to notify each other when they obtain a resource (e.g. perform a read of a particular block of memory 106) for processing a work group 116 (e.g. for processing the one or more work elements 104 in the work group 116) so that the other processing units 102 may take advantage of the resource being available (e.g. so that the other processing units 102 can obtain the data corresponding to the memory block from the staging cache 108 instead of fetching the data from the main memory 106). This allows the processing units 102 to act independently, but to be aware of what the other processing units 102 are doing so that they can co-ordinate their processing of similar work elements 104.

Specifically, the scheduling logic 112 is configured to notify the other processing units 102 that it has requested a particular resource associated with the selected work group. In some cases the scheduling logic 112 may be configured to notify the other processing units 102 that the scheduling logic 112 has requested a particular resource in response to requesting the particular resource (e.g. in response to initiating a fetch of memory 106) whereas in other cases the scheduling logic 112 may be configured to notify the other processing units 102 that it has requested the particular resource in response to receiving the particular resource (e.g. in response to receiving the fulfilled memory fetch). Whether or not the scheduling logic 112 is configured to notify the other processing units 102 of a request for a resource in response to initiating the request, or in response to receiving the requested resource, may be based on the latencies of the architecture. For example, if the latencies of the architecture are such that if the scheduling logic 112 waits to notify the other processing units 102 until the processing unit 102 receives the requested resource that it is likely that the resource may be evicted from the temporary storage (e.g. staging cache 108) before the other processing units 102 can obtain the resource from the temporary storage then the scheduling logic 112 may be configured to notify the other processing units as soon as the scheduling logic 112 has initiated a request.

In some cases the scheduling logic 112 may be configured to notify the other processing units 102 by sending a notification message. The notification message may comprise information identifying the message as a notification message and information identifying the resource (e.g. block of memory) that has been requested. In some cases the notification message may also include additional information such as, but not limited to the location of the resource in the temporary storage (e.g. staging cache 108); the processing unit 102 for which the resource was originally obtained; and/or the number of work elements 104 in the work group 116 for which the resource was originally obtained. For example, the notification message may include information that the data associated with node 55 is located in cache memory bank 3. The notification message may be transmitted using any suitable means. For example, the notification message may be transmitted using one or more signal lines; the notification message may be transmitted via HyperTransport (HT), QuickPathInterface or LVDS (low-voltage differential signaling) interfaces; or the notification message may be transmitted using any lower level transport protocol (e.g. where the processing units are distributed across a network).

In some cases the notification message may be sent, for example, as a broadcast message via a dedicated or shared bus 118. For example, in some cases there may be a dedicated bus between the processing units 102 for sending notification messages. In other cases, the notification messages may be sent on a shared bus (e.g. a bus which is used to send other communications). In other cases, the notification message may be sent directly or indirectly to the other processing units 102 by other means. An example method for notifying other processing units that a particular processing unit has obtained a particular resource is described below with reference to FIG. 3.

In response to being notified that another processing unit 102 has requested a particular resource for processing one or more work groups 116 (e.g. in response to receiving a notification message) the processing unit (e.g. the scheduling logic 112) determines whether there are any pending work groups 116 waiting in that processing unit's pool of pending work 110 that are associated with the identified resource. For example, if a processing unit 102 has been notified that another processing unit 102 has obtained resource A for processing one or more work groups 116 the scheduling logic 112 of that processing unit 102 searches the pool of pending work 110 for a pending work group 116 associated with resource A. If the processing unit 102 (e.g. scheduling logic 112) identifies a work group 116 associated with the identified resource then there is a notification hit and the processing unit 102 may change the priority of the identified work group if one or more conditions are met. For example, in some cases, if the identified work group 116 comprises at least a predetermined number of work elements 104 the processing unit (e.g. the scheduling logic 112) may prioritize the identified work group 116 so that the identified work group 116 is the next work group 116 to be processed by the processing logic 114. This allows the identified work group 116 to bypass other work groups 116 that may have had a higher priority according to the scheduling rules.

This allows the processing units 102 that receive the notification to take advantage of the fact that another processing unit 102 has already obtained the relevant resource. In particular, in the example of FIG. 1, this allows the processing unit 102 to obtain the resource (e.g. data associated with a particular block of memory) from the staging cache 108 instead of fetching the resource (e.g. data associated with the particular block of memory) from the memory 106. This may significantly reduce the time to obtain the relevant data and/or may significantly reduce the bandwidth between the processing units 102 and the memory 106. An example method for processing a notification message at a receiving processing unit 102 is described below with reference to FIG. 4.

In some cases, the staging cache 108 may be configured to store data fetched from the memory 106 by a processing unit 102 only for a limited amount of time after it has been placed in the staging cache 108. In other words, the data fetched from the memory 106 may only be guaranteed to be available in the staging cache 108 for a limited time after it has been fetched. The amount of time that fetched data is available in the staging cache 108 is referred to as the availability window of the data. In these cases, any processing unit 102 receiving a notification message related to particular data may have a limited amount of time to obtain the data from the staging cache 108. If a processing unit does not obtain the data from the staging cache 108 within this time period (e.g. within the availability window) the processing unit 102 may have to obtain the data from the memory 106 thus losing the advantage of the other processing unit 102 having already obtained the data.

More than one of the processing units 102 may generate a notification message per processing cycle (e.g. clock cycle). In some cases the receiving processing units 102 may only be able to process a maximum number of notification messages per processing cycle (e.g. clock cycle). Depending on the size of the availability window for data in the staging cache 108 the receiving processing units 102 may be configured to drop any notification messages above the maximum number of notification messages, or the receiving processing units 102 may be configured store any notification messages above the maximum number of notification messages for later processing. For example, if the availability window is small (e.g. the data is kept in the staging cache 108 for only one cycle (e.g. clock cycle) after it has been fetched) then the receiving processing units 102 may be configured to discard any received notification messages that cannot be processed in the current cycle (e.g. clock cycle). For example, if the processing unit can only process two notification messages per processing cycle (e.g. clock cycle) then it may discard or drop the $3^{rd}$ and subsequent notification messages received in the same clock cycle.

If, however, the availability window is larger (e.g. the data is kept in the staging cache 108 for several cycles (e.g. clock cycles) after it has been fetched) then the receiving processing units 102 may store any received notification messages that they cannot process in the current processing cycle (e.g. clock cycle). Then when the processing unit 102 subsequently encounters a processing cycle (e.g. clock cycle) in which the processing unit 102 does not receive any notification messages (or less than the maximum number of notification messages) then the processing unit 102 may process one or more of the stored notification messages.

In some cases the scheduling logic 112 may be configured to process stored notification messages regardless of how old the stored notification messages are. In these cases if the scheduling logic 112 determines that the associated pool of pending work 110 comprises a work group that is associated with the resource identified in a stored notification message then the scheduling logic 112 may be configured to attempt to obtain the identified resource from the temporary storage (e.g. staging cache 108) and if the resource has already been evicted from the temporary storage (e.g. staging cache 108) then the resource may be obtained from main memory 106 or via the cache hierarchy (if the staging cache 108 is part of a cache hierarchy).

In other cases, where each resource has a fixed time to live in the temporary storage (e.g. staging cache 108), then the scheduling logic 112 may be configured to track the time to live (TTL) for each resource identified in a stored notification message and only process a stored notification message (e.g. prioritize work groups associated with the identified resource) if the TTL has not expired. If the TTL has expired for the resource identified in the stored notification message then processing of the stored notification message may be aborted.

In yet other cases, the processing units (e.g. scheduling logic 112) may be configured to indicate their intention to obtain the resource identified in a notification message from the temporary resource (e.g. staging cache 108) by sending a subscription message to the temporary resource (e.g. staging cache 108) indicating an intention to obtain a particular resource from the temporary resource (e.g. staging cache 108). The temporary resource (e.g. staging cache 108) may in response to receiving a subscription message increment a counter associated with the resource to count the number of processing units that intend to obtain the resource from the temporary resource (e.g. staging cache 108). The temporary resource (e.g. staging cache 108) may be configured to decrement the corresponding counter when a resource is obtained from the temporary resource (e.g. staging cache 108) and the temporary resource (e.g. staging cache 108) may only evict a resource from the temporary storage (e.g. staging cache 108) when the counter reaches zero.

Although it has been described in reference to FIG. 1 that the scheduling logic 112 pre-obtains or fetches the resource(s) associated with the one or more selected work groups 116, in other examples it is the processing logic 114 that obtains or fetches the resource(s) associated with the one or more selected work groups 116 as part of processing of the work elements 104 forming the one or more selected work groups 116. In these examples, the processing logic 114 itself may be configured to generate and transmit the notification message informing the other processing units 102 that the resource has been requested; or the processing logic 114 may be configured to notify the scheduling logic 112 that the resource has been requested and/or obtained and in response to receiving the notification from the processing logic 114 the scheduling logic 112 may be configured to generated and transmit the notification message informing the other processing units 102 that the resource has been requested.

Similarly, although it has been described in reference to FIG. 1 that the scheduling logic 112 generates and transmits the notification messages, in other examples the notification messages may be generated and transmitted by the temporary memory (e.g. staging cache 208) and/or a central controller associated therewith (e.g. a memory controller) in response to receiving a resource request from one of the processing units 102 (e.g. from the scheduling logic 112 or the processing logic 114).

Although it has been described in reference to FIG. 1 that the scheduling logic 112 and the pool of pending work 110 associated with each processing unit 102 form part of that processing unit 102, in other examples, the scheduling unit 112 and/or the pool of pending work 110 may not form part of the associated processing unit 102 but may be associated with the processing unit 102 in another manner. For example, the scheduling unit 112 and/or the pool of pending work 110 may be external to the processing unit 102 but in communication with the processing unit 102.

Figure 2:
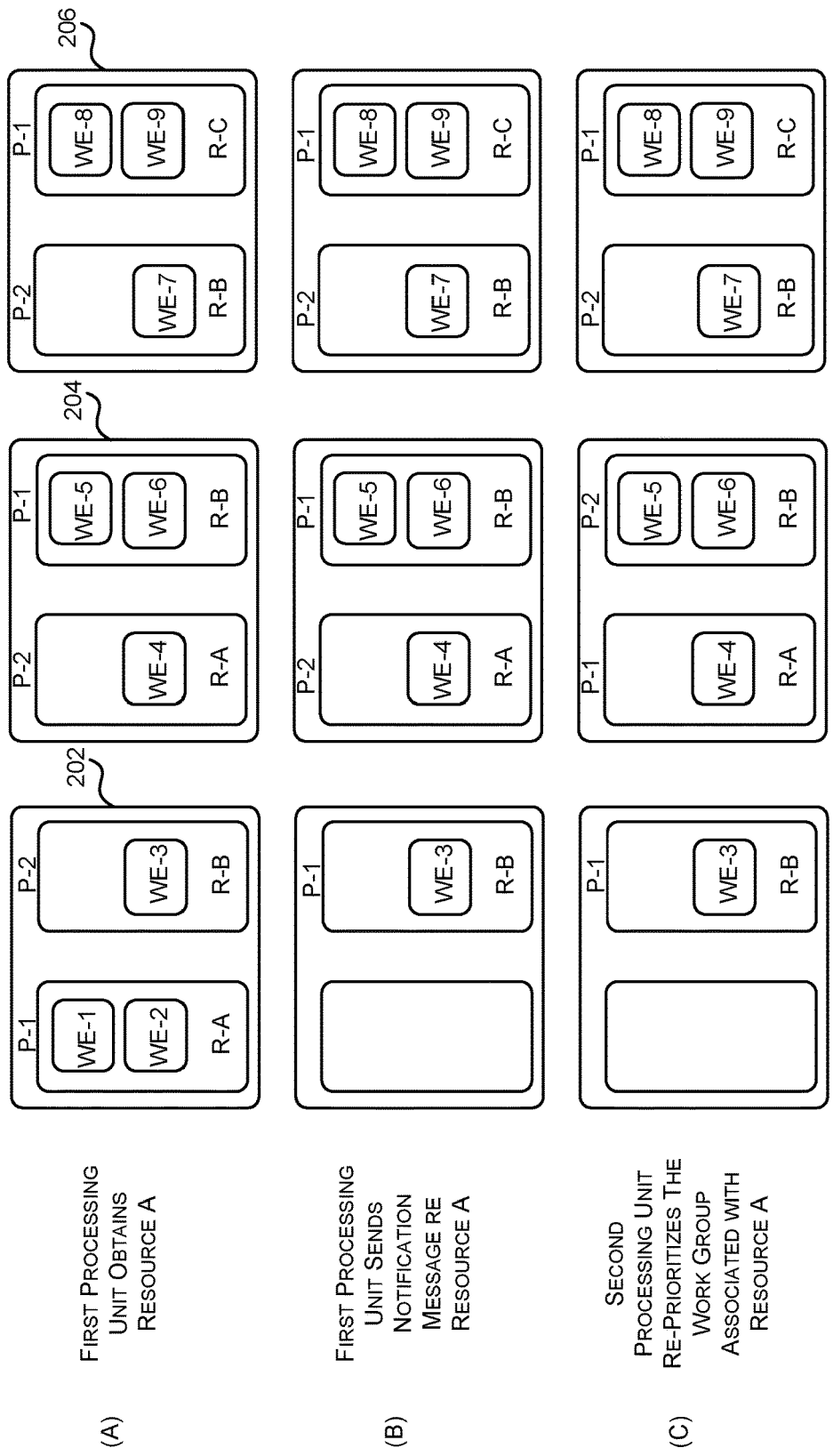
FIG. 2 is a schematic diagram illustrating the priority of work groups before and after receiving a notification message.

Reference is now made to FIG. 2 which is a schematic diagram which illustrates the techniques described herein using an example. Specifically, FIG. 2 illustrates three pools of pending work 202, 204, and 206 representing the pools of three processing units in a parallel computing architecture such as the parallel computing architecture of FIG. 1. Specifically, the first pool of pending work 202 corresponds to a first processing unit, the second pool of pending work 204 corresponds to a second processing unit, and the third pool of pending work 206 corresponds to a third processing unit. Each pool of pending work 202, 204 and 206 comprises one or more work groups and each work group comprises one or more work elements (WE) that are associated with the same resource. For example, the first pool of pending work 202 comprises a first work group that comprises work elements 1 and 2 (WE-1 and WE-2) that are both associated with resource A (R-A), and a second work group that comprises work element 3 (WE-3) that is associated with resource B (R-B); the second pool of pending work 202 comprises a first work group that comprises work element 4 (WE-4) that is associated with resource A (R-A), and a second work group that comprises work elements 5 and 6 (WE-5 and WE-6) that are associated with resource B (R-B); and the third pool of pending work 206 comprises a first work group that comprises work element 7 (WE-7) that is associated with resource B (R-B) and a second work group that comprises work elements 8 and 9 (WE-8 and WE-9) that are associated with resource C (R-C).

The work groups are given a priority ranking based on the scheduling rules. In the example of FIG. 2, work groups with more work elements are given a higher priority and work groups with fewer work elements are given a lower priority. For example, in the first pool of pending work 202 the first group is given a priority of 1 (P-1), where the lower the priority number the higher the priority, and the second work group is given a priority of 2 (P-2) since the second work group has fewer work elements compared to the first group; in the second pool of pending work 204 the second work group is given a priority of 1 (P-1) and the first work group is given a priority of 2 (P-2) since the second work group has more work elements; and similarly in the third pool of pending work 206 the second work group is given an priority of 1 (P-1) and the second work group is given a priority of 2 (P-2). It will be evident to a person of skill in the art that this is an example of how the work groups in a pool of pending work may be prioritized and in other examples other criteria may be used to determine the relative priority of the work groups in a pool of pending work.

If at (A) of FIG. 2 the first processing unit obtains resource A (R-A) to process the work elements (WE-1 and WE-2) in the first work group which causes resource A (R-A) to be available in the temporary storage (e.g. staging cache 108). Then at (B) of FIG. 2 the first processing unit will generate and send a notification message to the second and third processing units that resource A (R-A) has been obtained. In response to receiving the notification message the second and third processing units will determine whether there is at least one work group in their pool of pending work that is associated with resource A (R-A). As described above, the processing units may be configured to determine whether there is at least one work group in the pool of pending work for that processing unit that is associated with resource A (R-A) by comparing information identifying resource A (R-A) in the notification message against information stored in the pool of pending work 204, 206 identifying the resource associated with the work groups.

The third processing unit will determine that it does not have at least one work group in the pool of pending work 206 that is associated with resource A (R-A) since it only has work groups associated with resources B and C (R-B and R-C). As a result the third processing unit will not make any changes to the priority of the work groups in its pool of pending work (i.e. the second work group continues to have a priority of 1 (P-1) and the first work group continues to have a priority of 2 (P-2)). In contrast, the second processing unit will determine that it does have a work group in the pool of pending work that is associated with resource A (R-A). The second processing unit may then, if certain conditions are met, change the priority of the work groups so that the work group associated with resource A (R-A) now has the highest priority—a priority of 1 (P-1). As a result, the priority of the second work group drops to a priority of 2 (P-2) as shown at (C). This may allow the resource A to be obtained from the temporary storage (e.g. staging cache 108) instead of the main storage (e.g. main memory 106).

Figure 3:
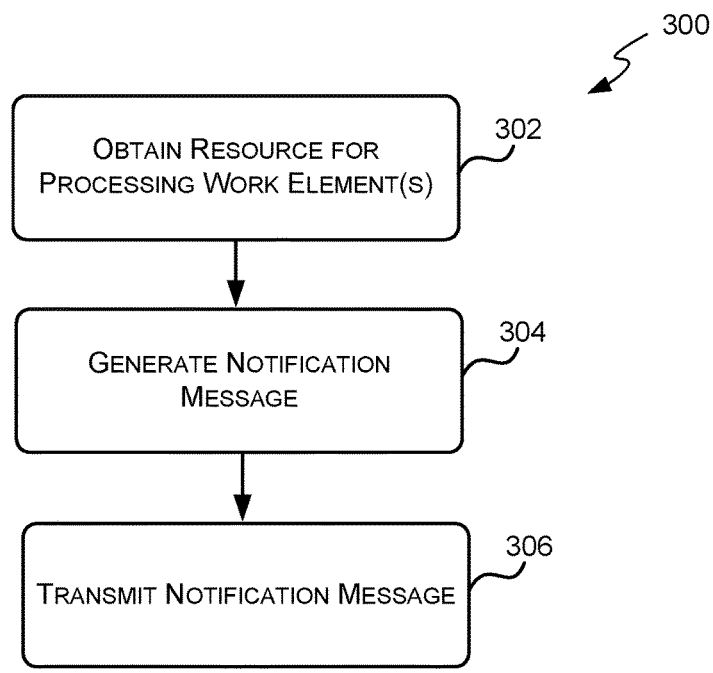
FIG. 3 is a flow diagram of an example method for notifying processing units that a resource has been requested.

Reference is now made to FIG. 3 which illustrates an example method 300 for a processing unit of a parallel computing architecture to notify the other processing units in the parallel computing architecture that the processing unit has obtained a resource for use in processing one or more work groups. The method 300 may be executed by the scheduling logic 112 of the processing unit 102; or a combination of the scheduling logic 112, the processing logic 114, and/or the staging cache 108.

The method 300 begins at block 302 where the processing unit 102 (e.g. the scheduling logic 112 or the processing logic 114) obtains a resource for processing of a work group 116 (e.g. for processing the work elements 104 in the work group 116). As described above, each processing unit 102 receives a plurality of work elements 104 for processing and each work element 104 is associated with a resource. The work elements 104 are grouped into work groups 116 based on the resource they are associated with. The stored work groups 116 are prioritized based on one or more scheduling rules and a work group 116 is selected for processing (e.g. by the scheduling logic 112) in accordance with the priorities. Once a work group 116 is selected for processing this may trigger the scheduling logic 112 to request the resource associated with the selected work group 116 or the processing logic 114, as part of the processing of the work group 116, may request the resource associated with the selected work group.

The mechanics of requesting the resource to process a work element will vary depending on the resource. For example, where, as in FIG. 1 the resource is data associated with a block of memory 106, the resource may be requested by initiating a read of the relevant address from memory 106. The result of the read request may be provided to both a temporary shared storage (e.g. the staging cache 108 of FIG. 1) for temporary storage and the requesting processing unit (e.g. scheduling logic 112 or the processing logic 114).

In some cases the method 300 proceeds directly to block 304 as soon as the resource has been requested (e.g. as soon as read request has been initiated). In other cases the method 300 proceeds to block 304 only after the resource has been received by the requestor (e.g. the scheduling logic 112 or the processing logic 114).

At block 304, a notification message which indicates to the other processing units 102 that the resource has been requested is generated (e.g. by the scheduling logic 112, the processing logic 114 or the staging cache 108 (or a controller associated therewith)). As described above, the notification message may comprise information identifying the message as a notification message and information identifying the resource that has been requested. For example, where the parallel computing architecture is configured to implement ray intersection testing the information identifying the resource that has been requested may be a node ID of a node in the hierarchy. Once the notification message has been generated the method 300 proceeds to block 306.

At block 306, the generated notification message is transmitted (e.g. by the scheduling logic 112, the processing logic 114 or the staging cache 108 (or a controller associated therewith)) to the other processing units 102 of the parallel computing architecture to notify the other processing units 102 that the resource has been requested. This allows the other processing units 102 to prioritize work groups 116 that are associated with the same resource to take advantage of the resource currently being available. The generated notification message may be transmitted (e.g. via the scheduling logic 112, the processing logic 114 or the staging cache 108 (or a controller associated therewith)) to the other processing units 102 via any suitable means. For example, as described above, there may be a shared bus or a dedicated bus between the processing units 102 and the processing unit 102 (e.g. the scheduling logic 112 or the processing logic 112) may be configured to transmit the generated via the shared or dedicated bus. Once the generated notification message has been transmitted, the method 300 ends.

Figure 4:
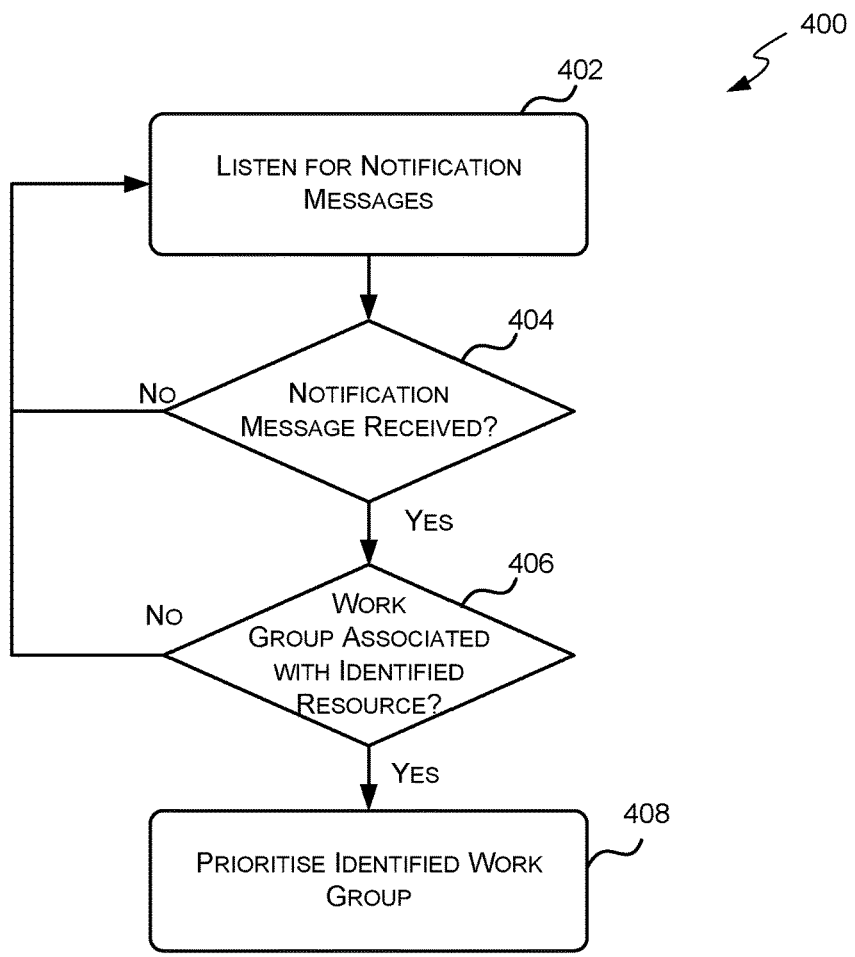
FIG. 4 is a flow diagram of an example method for processing a received notification message at a processing unit.

Reference is now made to FIG. 4 which illustrates an example method 400 for processing a notification message at a processing unit 102 which may be executed by the scheduling logic 112 of FIG. 1. The method 400 begins at block 402 where the processing unit 102 (e.g. scheduling logic 112) listens for notification messages. As described above, in some cases the processing units 102 are configured to send notification messages on a shared or dedicated bus, such as bus 118. In these cases, the processing unit 102 (e.g. scheduling logic 112) may be configured to monitor the shared or dedicated bus for messages.

The processing unit 102 (e.g. the scheduling logic 112) may be configured to identify at block 404 notification messages based on information in the message. For example, as described above, the notification messages may comprise an identifier, or the like, which identifies the message as a notification message. If the processing unit 102 (e.g. the scheduling logic 112) determines that a notification message has been received then the method 400 proceeds to block 406, otherwise the method 400 proceeds back to block 402 where the processing unit (e.g. the scheduling logic 112) continues to listen for notification messages.

At block 406, the processing unit (e.g. scheduling logic 112) determines whether there is at least one work group pending in that processing unit's pool of pending work 110 associated with the resource identified in the notification message. In particular, as described above a notification message includes information that identifies a resource that has been requested by a particular processing unit 102 to process a work group 116. The information identifying the resource may be an identifier of the resource or any other suitable information identifying the resource. For example, where the parallel computing architecture is configured to implement ray intersection testing and the work elements are rays and the resource is a block of memory associated with a node of the hierarchy the information identifying the resource may be a node ID.

The processing unit (e.g. scheduling logic 112) may be configured to determine whether that processing unit's pool of pending work 110 comprises any work groups that are associated with the resource identified in the notification message by comparing the information identifying the requested resource and information identifying the resource associated with each work group 116. For example, where the parallel computing architecture is configured to implement ray intersection testing, the processing unit 102 (e.g. scheduling logic 112) may be configured to compare the node ID information in the received notification message to the node IDs associated with the work groups 116 in the pool of pending work 110. If the node ID in the received notification message matches the node ID of at least one work group 116 in the pool of pending work then the pool of pending work comprises a work group that is associated with the resource identified in the notification message and thus there is a work group 116 hit. If the processing unit 102 (e.g. scheduling logic 112) identifies a work group 116 in the pool of pending work 110 associated with the resource identified in the notification message and the work group 116 then the method 400 proceeds to block 408. If, however, the processing unit 102 does not identify a work group 116 in the pool of pending work 110 that is associated with the identified resource then the method 400 proceeds back to block 402 where the processing unit (e.g. the scheduling logic 112) continues to listen for notification messages.

At block 408, the processing unit 102 (e.g. scheduling logic 112) may modify the priority of the identified work group to take advantage of the fact that the identified resource is available from the temporary storage (e.g. from the staging cache 108). As described above, the work groups in the pool of pending work may be prioritized for processing based on one or more scheduling rules. For example, as described above, work groups with a higher number of work elements may be prioritized over work groups with a smaller number of work elements. In some cases, if one or more conditions are met then the processing unit 102 (e.g. scheduling logic 112) adjusts the priority of the identified work group 116 to take advantage of the fact that the identified resource is available. For example, the processing unit (e.g. scheduling logic 112) may prioritize the identified work group if the identified work group 116 comprises a minimum number of work elements so that it is the highest priority work group 116.

As described above, in some cases, processing units 102 (e.g. scheduling logic 112) may receive more than one notification message in a processing cycle (e.g. clock cycle). In these cases the receiving processing units 102 may only be able to process a maximum number of notification messages per processing cycle (e.g. clock cycle). Where a processing unit 102 receives more notification messages in a processing cycle (e.g. clock cycle) than the processing unit 102 may process in a processing cycle (e.g. clock cycle) the processing unit 102 may execute blocks 406 and 408 for each notification message up to the maximum and either discard the notification messages above the maximum or store the notification messages above the maximum for later processing. As described above, whether or not the processing unit 102 is configured to discard or save the notification messages may be based on the size of the availability window (i.e. the amount of time the staging cache 108 stores data retrieved from the memory 106 by a processing unit 102).

Figure 5:
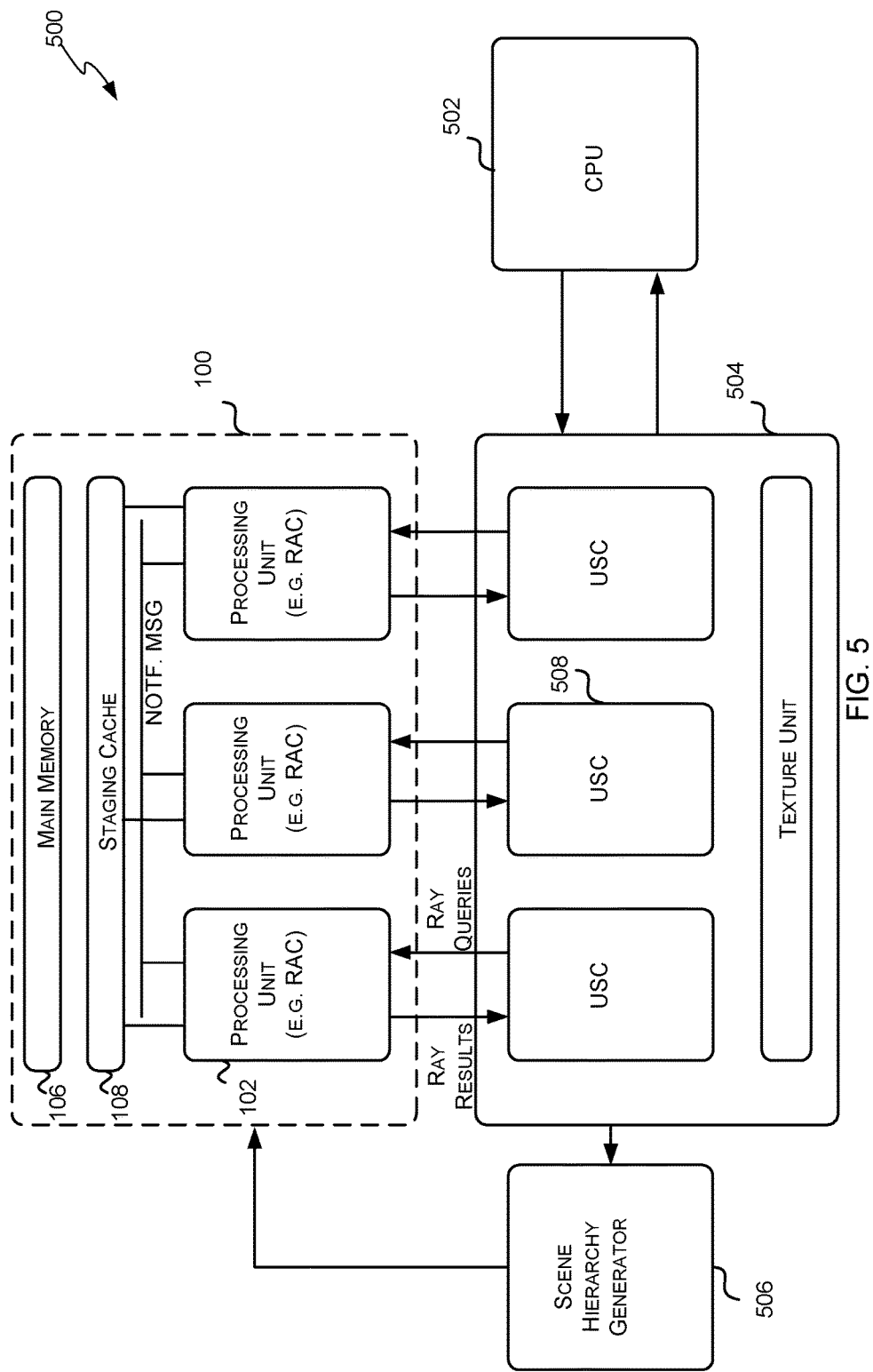
FIG. 5 is a block diagram of an example ray tracing system comprising the parallel computing architecture of FIG. 1 to implement ray intersection testing.

Reference is now made to FIG. 5 which illustrates an example ray tracing graphics processing system 500 which uses the parallel computing architecture described herein. Specifically, the ray tracing graphics processing system 500 comprises a CPU 502, a unified shading cluster array 504 configured to performing shading, a scene hierarchy generator 506, and the parallel computing architecture 100 of FIG. 1 configured to implement ray intersection testing such that the processing units 102 are ray tracing cluster (RAC) units. The CPU 502 sends a request to render a scene to the unified shading cluster array 504 which causes (i) the scene hierarchy generator 506 to generate the node hierarchy and save the hierarchy in memory 106; and (ii) the unified shading cluster array 504 to generate and send an initial set of rays to be tested against the root node of the tree. The RACs test the initial set of rays against the hierarchy generated by the scene hierarchy generator 506 to find the closest leaf node. As the RACs 102 fetch node data from the memory 106 they send notification messages to each other as described above so that the other RACs 102 can take advantage of the node data being available in the staging cache 108. Once a leaf node is located it is sent to the unified shading cluster array 504 for processing by one shading cluster unit (SCU) 508 of a plurality of SCUs 508. The results of the shading are then provided to the CPU 502.

While it has been described above that the methods and techniques described above for coordinating the operation of parallel processing units by sending notification messages between the processing units can be used in a parallel computing architecture configured to implement ray intersection testing the methods and techniques may also be used in a parallel computing architecture configured to perform the shading aspect of ray tracing such as the unified shading cluster array 504 of FIG. 5. For example, the SCUs described in relation to FIG. 5 could be configured with storage units 110 and scheduling logic 112 as described above so that the SCUs group the work received from the RACs into groups based on an arbitrary scheduling key. The scheduling key is designed to encompass enough information that shaders (e.g. SCUs) with the same scheduling key are likely to use the same resource (e.g. shader program). What the scheduling key corresponds to may be established by the shader design engineer. Then the SCUs can exchange and respond to notification messages when the SCUs obtain a particular resource (e.g. shading program) so that the other SCUs can use the obtained resource.

Figure 6:
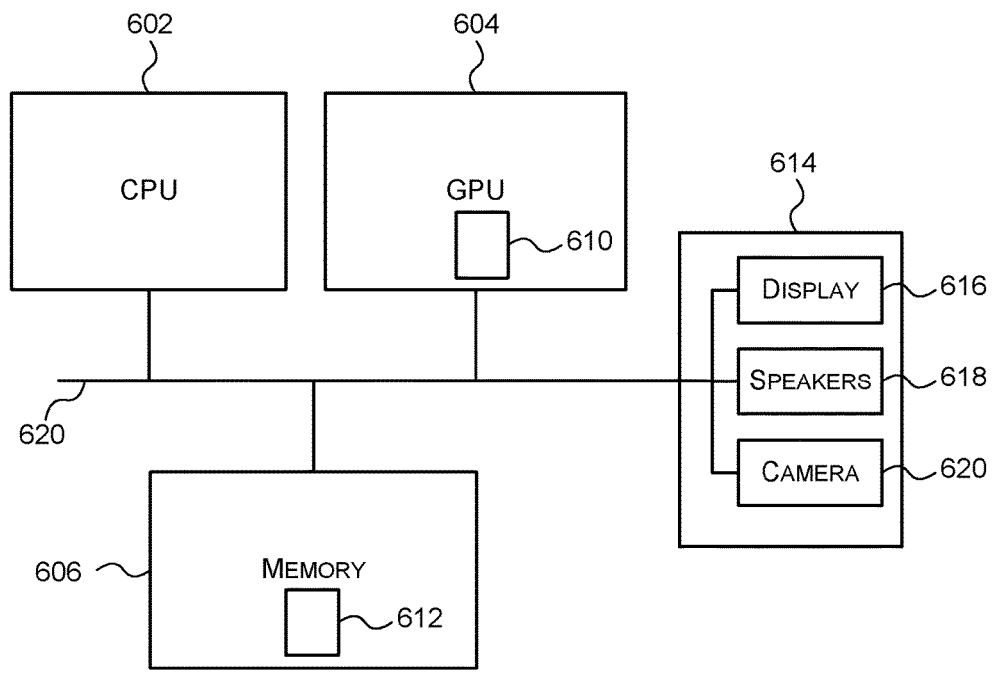
FIG. 6 shows an example computer system in which the parallel computing architecture of FIG. 1 is implemented.

FIG. 6 shows a computer system in which the graphics processing system described herein may be implemented. The computer system comprises a CPU 602, a GPU 604, a memory 606 and other devices 614, such as a display 616, speakers 618 and a camera 620. A graphics processing system 610 (corresponding to graphics processing system 500) is implemented on the GPU 604. In other examples, the processing block 910 may be implemented on the CPU 602. The components of the computer system can communicate with each other via a communications bus 920. A store 912 (corresponding to store 106) is implemented as part of the memory 906.

A further example provides a method (300, 400) of coordinating the operation of a plurality of processing units in a parallel computing architecture, the method (300, 400) comprising: requesting a resource from a main storage, for storage in a temporary storage, the resource being associated with a work group of one or more work groups in a first pool of pending work associated with a first processing unit of the plurality of processing units, each work group of the one or more work groups comprising one or more work elements to be processed by the first processing unit using the associated resource (302); transmitting a notification message to scheduling logic associated with a second processing unit (102) of the plurality of processing units (102), the notification message comprising an indication of the requested resource; in response to receiving the notification message at the scheduling logic associated with the second processing unit, determining whether a second pool of pending work associated with the second processing unit comprises a work group associated with the resource (404, 406); and in response to determining that the second pool of pending work comprises a work group associated with the resource, prioritizing processing of the work group associated with the resource by the second processing unit so as to obtain the resource from the temporary storage (408).

The method may further comprise, prior to determining whether the second pool of pending work comprises a work group associated with the resource, determining whether the scheduling logic has already received a maximum number of notification messages in a current processing cycle, and only determining whether the second pool of pending work comprises a work group associated with the resource in response to determining that the scheduling logic has not already received a maximum number of notification messages in the current processing cycle.

The method may further comprise, in response to determining that the scheduling logic has already received a maximum number of notification messages in the current processing cycle, discarding the notification message.

The method may further comprise, in response to determining that the scheduling logic has already received a maximum number of notification messages in the current processing cycle, storing the notification message.

The method may further comprise, in response to determining that the scheduling logic has received less than the maximum number of notification messages in the current processing cycle by the scheduling logic, determining whether the second pool of pending work comprises a work group associated with a resource indicated in a stored notification message, and in response to determining that the second pool of pending work comprises a work group associated with the resource indicated in the stored notification message, prioritizing processing of the work group associated with the resource indicated in the stored notification message by the second processing unit.

In various examples, the processing of the work group associated with the resource indicated in the stored notification message is only prioritized in response to determining an availability window for the resource indicated in the stored notification message in the temporary storage has not expired.

Prioritizing processing of the work group associated with the resource by the second processing unit may comprise assigning a highest priority to the work group associated with the resource so that the work group associated with the resource will be a next work group processed by the second processing unit.

Determining whether the second pool of pending work may comprise a work group associated with the resource comprises comparing information in the notification message identifying the resource to information in the second pool of pending work identifying the resource each work group is associated with to determine if there is a match.

The processing units may be connected by a bus and transmitting the notification message may comprise transmitting the notification message over the bus. The bus may be a dedicated bus for notification messages.

The main storage may be a main memory and the temporary storage may be a cache for the main memory.

The method may further comprise, receiving at the first pool of pending work a work element for processing by the first processing unit; and storing the received work element in the first pool of pending work in association with one of the one or more work groups based on the resource the received work element is associated with.

The method may further comprise, at scheduling logic associated with the first processing unit, selecting the work group based on priorities allocated to the one or more work groups in the first pool of pending work.

The method may further comprise, determining, at the scheduling logic associated with the first processing unit, the priority of the one or more work groups (116) based on one or more scheduling rules.

The one or more scheduling rules may specify that a work group with at least a predetermined number of work elements is prioritized over other work groups.

The plurality of processing units may be configured to implement ray intersection testing and each work element is a ray to be tested and each resource is a block of memory associated with a node of a hierarchy representing a three-dimensional scene to be rendered and each processing unit comprises processing logic configured to determine if a received ray intersects with the associated node.

The processing units of FIG. 1 are shown as comprising a number of functional/logic blocks. This is schematic only and is not intended to define a strict division between different logic elements of such entities. Each functional block may be provided in any suitable manner. It is to be understood that intermediate values described herein as being formed by a logic block need not be physically generated by the logic block at any point and may merely represent logical values which conveniently describe the processing performed by the logic block between its input and output.

The parallel computing architecture described herein may be embodied in hardware on an integrated circuit. The parallel computing architecture described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a parallel computing architecture configured to perform any of the methods described herein, or to manufacture a parallel computing architecture described herein. An integrated circuit definition dataset may be, for example, an integrated circuit description.

Therefore, there may be provided a method of manufacturing, at an integrated circuit manufacturing system, a parallel computing architecture as described herein. Furthermore, there may be provided an integrated circuit definition dataset that, when processed in an integrated circuit manufacturing system, causes the method of manufacturing a parallel computing architecture to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a parallel computing architecture will now be described with respect to FIG. 7.

Figure 7:
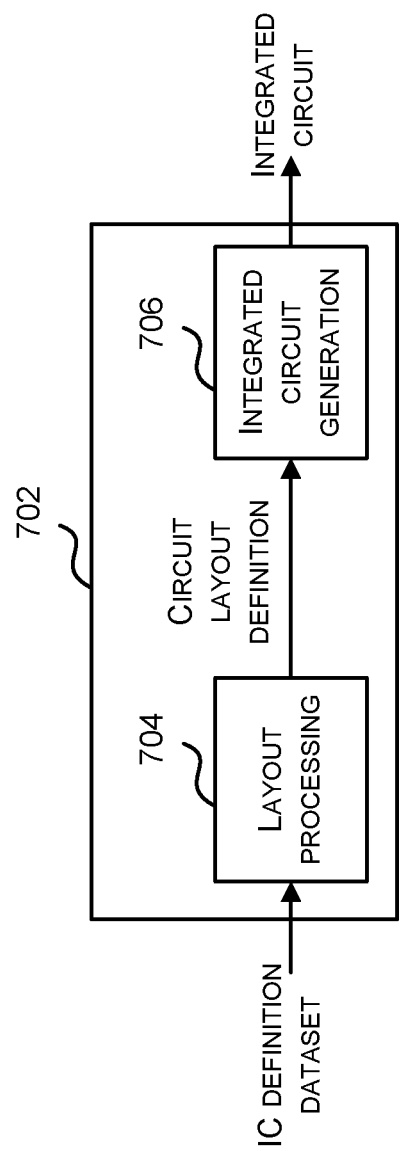
FIG. 7 shows a block diagram of an example integrated circuit manufacturing system for generating an integrated circuit embodying a parallel computing architecture.

FIG. 7 shows an example of an integrated circuit (IC) manufacturing system 702 which is configured to manufacture a parallel computing architecture as described in any of the examples herein. In particular, the IC manufacturing system 702 comprises a layout processing system 704 and an integrated circuit generation system 706. The IC manufacturing system 702 is configured to receive an IC definition dataset (e.g. defining a parallel computing architecture as described in any of the examples herein), process the IC definition dataset, and generate an IC according to the IC definition dataset (e.g. which embodies a parallel computing architecture as described in any of the examples herein). The processing of the IC definition dataset configures the IC manufacturing system 702 to manufacture an integrated circuit embodying a parallel computing architecture as described in any of the examples herein.

The layout processing system 704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 704 has determined the circuit layout it may output a circuit layout definition to the IC generation system 706. A circuit layout definition may be, for example, a circuit layout description.

The IC generation system 706 generates an IC according to the circuit layout definition, as is known in the art. For example, the IC generation system 706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 706 may be in the form of computer-readable code which the IC generation system 706 can use to form a suitable mask for use in generating an IC.

The different processes performed by the IC manufacturing system 702 may be implemented all in one location, e.g. by one party. Alternatively, the IC manufacturing system 702 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a parallel computing architecture without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 7 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 7, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

The implementation of concepts set forth in this application in devices, apparatus, modules, and/or systems (as well as in methods implemented herein) may give rise to performance improvements when compared with known implementations.

The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget."

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A parallel computing architecture comprising, for each of a plurality of processing units:
    a pool of pending work configured to store one or more work groups, each work group being associated with a resource and comprising one or more work elements to be processed by the processing unit using that resource;
    hardware scheduling logic configured to:
        select a work group of the one or more work groups for processing;
        request a particular resource associated with the selected work group from a main storage, for storage in a temporary storage;
        transmit a notification message to one or more other processing units of the plurality of processing units, the notification message comprising an indication of the requested particular resource; and
        in response to receiving a notification message from another processing unit of the plurality of processing units which comprises an indication of a specific resource that has been requested, determine whether the pool of pending work comprises a work group associated with the specific resource; and
        in response to determining that the pool of pending work comprises a work group associated with the specific resource, prioritize processing of the work group associated with the specific resource so as to obtain the specific resource from the temporary storage.

2. The parallel computing architecture of claim 1, wherein the scheduling logic is further configured to, prior to determining whether the pool of pending work comprises a work group associated with the specific resource, determine whether the scheduling logic has already received a maximum number of notification messages in a current processing cycle, and only determine whether the pool of pending work comprises a work group associated with the specific resource in response to determining that the scheduling logic has not already received the maximum number of notification messages in the current processing cycle.

3. The parallel computing architecture of claim 2, wherein the scheduling logic is further configured to, in response to determining that the scheduling logic has already received a maximum number of notification messages in the current processing cycle, discard the notification message.

4. The parallel computing architecture of claim 2, wherein the scheduling logic is further configured to, in response to determining that the scheduling logic has already received a maximum number of notification messages in the current processing cycle, store the notification message.

5. The parallel computing architecture of claim 4, wherein the scheduling logic is further configured to, in response to determining that less than the maximum of notification messages have been received in the current processing cycle, determine whether the pool of pending work comprises a work group associated with a resource indicated in a stored notification message, and in response to determining that the pool of pending work comprises a work group associated with the resource indicated in the stored notification message, prioritize processing of the work group associated with the resource indicated in the stored notification message so as to obtain the resource indicated in the stored notification message from the temporary storage.

6. The parallel computing architecture of claim 5, wherein the scheduling logic is configured to only prioritize processing of the work group associated with the resource indicated in the stored notification message in response to determining an availability window for the resource indicated in the stored message in the temporary storage has not expired.

7. The parallel computing architecture of claim 1, wherein the scheduling logic is configured to select the work group for processing based on a priority of the one or more work groups.

8. The parallel computing architecture of claim 7, wherein the scheduling logic is configured to prioritize processing of the work group associated with the specific resource by assigning a highest priority to the work group associated with the specific resource so that the work group associated with the specific resource will be a next work group processed by the processing unit.

9. The parallel computing architecture of claim 1, wherein the received notification message comprises information identifying the specific resource, the pool of pending work comprises information for each of the one or more work groups identifying the resource that work group is associated with, and the scheduling logic is configured to determine whether the pool of pending work comprises a work group associated with the specific resource by comparing the information in the received notification message to the information in the pool of pending work identifying the resource each of the one or more work groups is associated with to determine if there is a match.

10. The parallel computing architecture of claim 1, wherein the plurality of processing units are connected by a bus and the scheduling logic is configured to transmit the notification message over the bus.

11. The parallel computing architecture of claim 10, wherein the bus is a dedicated bus for notification messages.

12. The parallel computing architecture of claim 1, wherein the main storage is a main memory and the temporary storage is a cache for the main memory.

13. The parallel computing architecture of claim 1, wherein the pool of pending work is configured to receive a work element and store the received work element in association with one of the one or more work groups based on the resource the received work element is associated with.

14. The parallel computing architecture of claim 1, wherein the scheduling logic is configured to determine the priority of the one or more work groups based on one or more scheduling rules.

15. The parallel computing architecture of claim 14, wherein the one or more scheduling rules specify that work groups with at least a predetermined number of work elements are prioritized over other work groups.

16. The parallel computing architecture of claim 1, wherein the plurality of processing units are configured to implement ray intersection testing and each work element is a ray to be tested and each resource is a block of memory associated with a node of a hierarchy representing a three-dimensional scene to be rendered and each processing unit comprises processing logic configured to determine if a received ray intersects with the associated node.

17. A method of coordinating the operation of a plurality of processing units in a parallel computing architecture, the method comprising:
requesting a resource from a main storage, for storage in a temporary storage, the resource being associated with a work group of one or more work groups in a first pool of pending work associated with a first processing unit of the plurality of processing units, each work group of the one or more work groups comprising one or more work elements to be processed by the first processing unit using the associated resource;
transmitting a notification message to scheduling logic associated with a second processing unit of the plurality of processing units, the notification message comprising an indication of the requested resource;
in response to receiving the notification message at the scheduling logic associated with the second processing unit, determining whether a second pool of pending work associated with the second processing unit comprises a work group associated with the resource; and
in response to determining that the second pool of pending work comprises a work group associated with the resource, prioritizing processing of the work group associated with the resource by the second processing unit so as to obtain the resource from the temporary storage.

18. The method of claim 17, further comprising, prior to determining whether the second pool of pending work comprises a work group associated with the resource, determining whether the scheduling logic has already received a maximum number of notification messages in a current processing cycle, and only determining whether the second pool of pending work comprises a work group associated with the resource in response to determining that the scheduling logic has not already received a maximum number of notification messages in the current processing cycle.

19. The method of claim 18, further comprising, in response to determining that the scheduling logic has already received a maximum number of notification messages in the current processing cycle, discarding the notification message or storing the notification message.

20. A non-transitory computer readable storage medium having stored thereon a computer readable description of an integrated circuit that, when processed in an integrated circuit manufacturing system, causes the integrated circuit manufacturing system to manufacture a parallel computing architecture comprising, for each of a plurality of processing units:
a pool of pending work configured to store one or more work groups, each work group being associated with a resource and comprising one or more work elements to be processed by the processing unit using that resource;
scheduling logic configured to:
select a work group of the one or more work groups for processing;
request a particular resource associated with the selected work group from a main storage, for storage in a temporary storage;
transmit a notification message to one or more other processing units of the plurality of processing units, the notification message comprising an indication of the requested particular resource; and
in response to receiving a notification message from another processing unit of the plurality of processing units which comprises an indication of a specific resource that has been requested, determine whether the pool of pending work comprises a work group associated with the specific resource; and
in response to determining that the pool of pending work comprises a work group associated with the specific resource, prioritize processing of the work group associated with the specific resource so as to obtain the specific resource from the temporary storage.

* * * * *